US 8,040,915 B2

(12) United States Patent
Cummings

(10) Patent No.: US 8,040,915 B2
(45) Date of Patent: Oct. 18, 2011

(54) SYSTEM, METHOD, AND COMPUTER PROGRAM PRODUCT FOR FACILITATING COMMUNICATION BETWEEN DEVICES IMPLEMENTING PROPRIETARY FEATURES IN A DOCSIS-COMPLIANT BROADBAND COMMUNICATION SYSTEM

(75) Inventor: Scott A Cummings, Suwanee, GA (US)

(73) Assignee: Broadcom Corporation, Irvine, CA (US)

( * ) Notice: Subject to any disclaimer, the term of this patent is extended or adjusted under 35 U.S.C. 154(b) by 1648 days.

(21) Appl. No.: 10/440,325

(22) Filed: May 19, 2003

(65) Prior Publication Data

US 2004/0233926 A1    Nov. 25, 2004

(51) Int. Cl.
    *H04J 3/16*    (2006.01)
(52) U.S. Cl. .................................... 370/468; 725/114
(58) Field of Classification Search .......... 370/312, 370/389, 390, 392, 430, 432, 473, 464–468; 725/114, 117, 91, 97, 103, 138, 144
    See application file for complete search history.

(56) References Cited

U.S. PATENT DOCUMENTS

| 6,003,041 | A * | 12/1999 | Wugofski ............... 370/464 |
| 6,072,808 | A * | 6/2000 | O'Connor ............... 370/486 |
| 6,459,703 | B1 * | 10/2002 | Grimwood et al. ........ 370/442 |
| 6,757,253 | B1 * | 6/2004 | Cooper et al. ........... 370/241 |
| 7,068,712 | B1 * | 6/2006 | Zang et al. ............. 375/222 |
| 7,085,287 | B1 * | 8/2006 | Chapman ............... 370/468 |
| 2001/0030975 | A1 * | 10/2001 | Limb et al. .............. 370/465 |
| 2001/0055319 | A1 * | 12/2001 | Quigley et al. .......... 370/480 |
| 2002/0061012 | A1 * | 5/2002 | Thi et al. .............. 370/352 |
| 2002/0062394 | A1 * | 5/2002 | Bunn et al. ............. 709/246 |
| 2002/0062450 | A1 * | 5/2002 | Carlson et al. .......... 713/200 |
| 2002/0080868 | A1 | 6/2002 | Bunn et al. |
| 2002/0115421 | A1 * | 8/2002 | Shahar et al. ........... 455/403 |
| 2005/0010958 | A1 * | 1/2005 | Rakib et al. ............ 725/111 |

FOREIGN PATENT DOCUMENTS

EP    1 063 801 A1    12/2000

OTHER PUBLICATIONS

"Radio Frequency Interface Specification SP-RFIv2.0-I03-021218," Data-Over-Cable Service Interface Specifications, Cable Television Laboratories, Inc., Dec. 18, 2002, pp. i-xxiv and 1-482.
U.S. Appl. No. 09/430,821, filed Oct. 29, 1999, Quigley et al.
Search Report for European Application No. 04011967.9-1525 mailed Jun. 20, 2008, 3 pgs.
Cable Television Laboratories: "Radio Frequency Interface Specification SP-RFIv2.0-I03-021218", XP002481281, http://www.cablelabs.com/specifications/archives/SP-RFIv2.0-I03-021218.pdf, Dec. 18, 2002, pp. 233-317.

* cited by examiner

*Primary Examiner* — Ricky Ngo
*Assistant Examiner* — Phuongchau B Nguyen
(74) *Attorney, Agent, or Firm* — Sterne, Kessler, Goldstein & Fox P.L.L.C.

(57) ABSTRACT

A system, method and computer program product that facilitates communication between devices that implement at least one proprietary feature in a DOCSIS-compliant broadband communication system. A logical channel is established for communication between a first device, such as a cable modem termination system (CMTS), that implements at least one proprietary feature, and other devices that also implement the at least one proprietary feature. Registration information is then received from a second device, such as a cable modem, wherein the registration information indicates that the second device also implements the at least one proprietary feature. In response to receiving the registration information, the second device is assigned to the logical channel.

27 Claims, 11 Drawing Sheets

SYSTEM, METHOD, AND COMPUTER PROGRAM PRODUCT FOR FACILITATING COMMUNICATION BETWEEN DEVICES IMPLEMENTING PROPRIETARY FEATURES IN A DOCSIS-COMPLIANT BROADBAND COMMUNICATION SYSTEM

BACKGROUND OF THE INVENTION

1. Field of the Invention

The present invention is generally directed to broadband communication systems. In particular, the present invention relates to broadband communication systems that comply with the Data Over Cable Service Interface Specification (DOCSIS), including but not limited to DOCSIS-compliant cable modem communication systems.

2. Background

Conventional cable modem systems utilize DOCSIS-compliant equipment and protocols to carry out the transfer of data packets between multiple cable modems at the customer premises and a cable modem termination system (CMTS) at the cable headend. The term DOCSIS (Data Over Cable System Interface Specification) generally refers to a group of specifications published by CableLabs that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. The most current version of the DOCSIS specification is DOCSIS 2.0.

It has been observed, however, that the use of proprietary features or protocols that are not provided for, or permitted by, the DOCSIS specification may be advantageous within a DOCSIS-compliant cable modem system. For example, the modification of certain DOCSIS-defined physical (PHY) layer or Media Access Control (MAC) layer parameters and/or the use of different PHY or MAC technologies than those supported by DOCSIS may provide a variety of benefits. Such benefits can range from providing better system throughput, reducing latency, reducing the cost of the cable modem and/or the CMTS, providing a system with better signal integrity, providing improved utilization of the spectrum, reducing the area of either the cable modem or the CMTS, or providing better noise immunity.

Heretofore, such use of proprietary features that extend beyond DOCSIS has been avoided. This is due, in part, to the fact that the DOCSIS specification does not provide a mechanism for implementing proprietary features. Moreover, because conventional CMTS and cable modem equipment have been designed in accordance with the DOCSIS specification, the implementation of proprietary features has been avoided to ensure interoperability between cable modem system components.

Accordingly, what is desired is a system, method and computer program product that enables the use of proprietary features that are not provided for, or permitted by, the DOCSIS specification within a DOCSIS-compliant broadband communication system, such as a DOCSIS-compliant cable modem system. For example, the desired system, method and computer program product should support the modification of DOCSIS-defined physical (PHY) layer or Media Access Control (MAC) layer parameters and/or the use of different PHY or MAC technologies than those supported by DOCSIS. However, the desired system, method and computer program product should also be interoperable with DOCSIS in the sense that system components that support the proprietary features can exist on the same network with standard DOCSIS-compliant components that do not. Furthermore, the desired system and method should be implemented in a manner that requires minimal modification to the design of existing system components, such as the design of existing cable modem and CMTS equipment.

BRIEF SUMMARY OF THE INVENTION

The present invention uses DOCSIS 2.0 logical upstream channels to support the use of features, protocols, and technologies that extend beyond the DOCSIS specification within a DOCSIS-compliant broadband communication system, such as a DOCSIS-compliant cable modem system, while ensuring interoperability with conventional DOCSIS-compliant equipment. In particular, and as will be described in more detail herein, embodiments of the invention provide a method, system and computer program product for facilitating communication between devices that implement at least one proprietary feature in a DOCSIS-compliant broadband communication system.

In accordance with one embodiment of the present invention, a logical channel is established for communication between a first device, such as a cable modem termination system (CMTS), that implements at least one proprietary feature, and other devices that also implement the at least one proprietary feature. Registration information is then received from a second device, such as a cable modem, wherein the registration information indicates that the second device also implements the at least one proprietary feature. In response to receiving the registration information, the second device is assigned to the logical channel.

In an alternate embodiment of the present invention, a CMTS that implements at least one proprietary feature in a DOCSIS-compliant cable modem system comprises an upstream channel manager and a registration module. The upstream channel manager is adapted to establish a logical channel for communication with cable modems that implement the at least one proprietary feature. The registration module is adapted to receive registration information from a cable modem, wherein the registration information indicates that the cable modem implements the at least one proprietary feature, and to assign the cable modem to the logical channel in response to receiving the registration information.

In another embodiment of the present invention, a computer program product is provided. The computer program product comprises a computer useable medium having computer program logic recorded thereon for enabling a processor to facilitate communication between devices implementing proprietary features in a DOCSIS-compliant broadband communication system. The computer program logic comprises means for enabling the processor to establish a logical channel for communication between a first device, such as a CMTS, that implements at least one proprietary feature and other devices that implement the at least one proprietary feature. The computer program logic also comprises means for enabling the processor to receive registration information from a second device, such as a cable modem, wherein the registration information indicates that the second device implements the at least one proprietary feature. The computer program logic further comprises means for enabling the processor to assign the second device to the logical channel.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
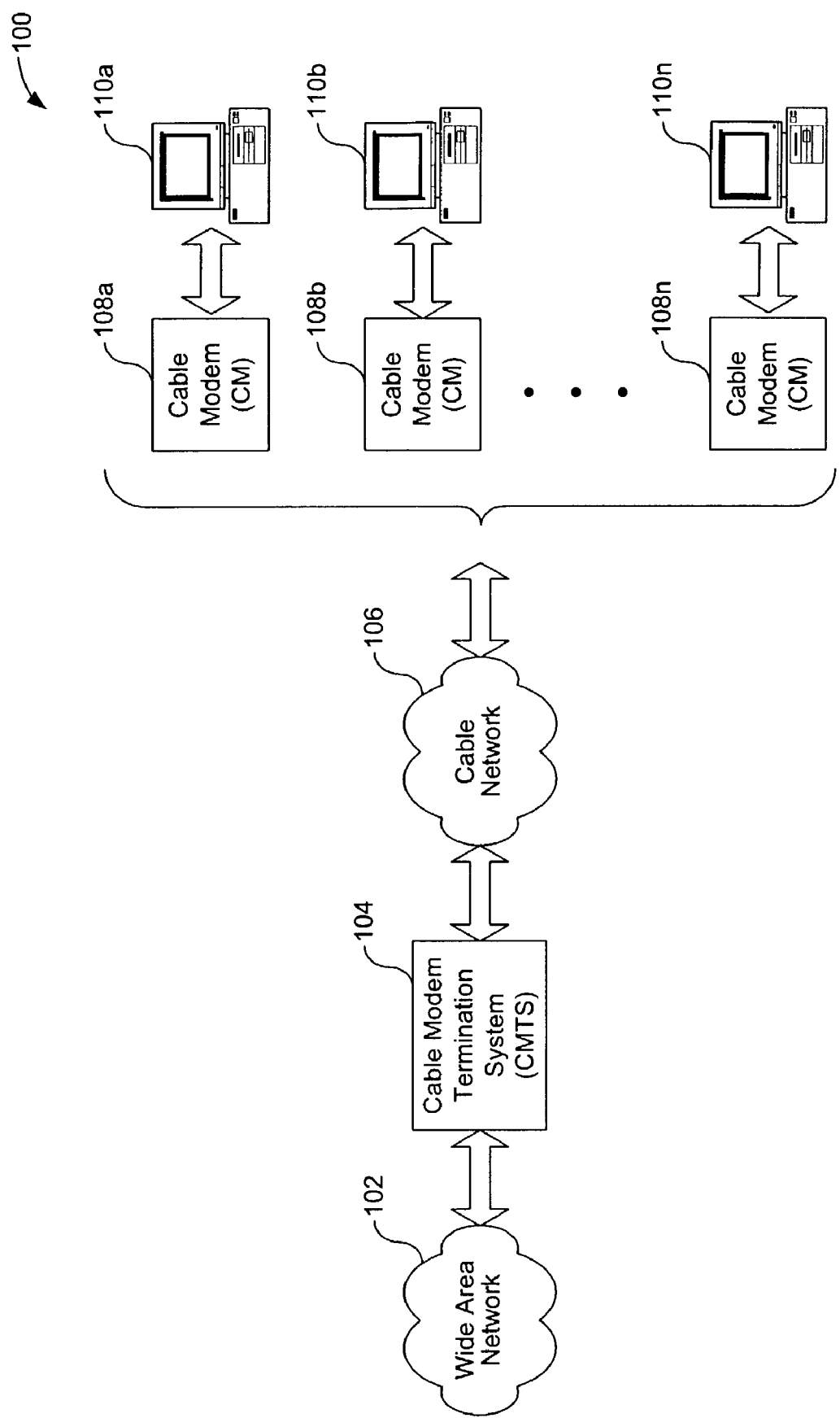
FIG. 1 depicts basic elements of an example DOCSIS-compliant cable modem communication system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Introduction to DOCSIS 2.0 Logical Channels

Common to all DOCSIS-compliant broadband data communication architectures is the transfer of data between a central location and many remote subscribers over a shared communications medium. The terms used to describe the central location vary depending on the type of communication architecture: for example, in cable modem systems, the central location is typically referred to as the headend, in broadband terrestrial fixed wireless systems, it is typically referred to as a wireless access termination system (WATS), and in two-way satellite communication systems, it is typically referred to as the satellite gateway. Terms used to describe subscriber equipment also vary depending on the type of communication architecture: for example, in cable modem systems, such equipment is typically referred to as a cable modem (CM), in broadband terrestrial fixed wireless systems, it is typically referred to as a wireless modem (WM), and in two-way satellite communication systems, it is typically referred to as a satellite modem (SM).

For the purposes of the description provided herein, terminology pertaining to cable modem systems will be used. However, as will be appreciated by persons skilled in the relevant art(s) based on the teachings provided herein, the present invention is not limited to cable modem systems, and may be implemented, for example, in any DOCSIS-compliant broadband communication system.

FIG. 1 depicts basic elements of an example DOCSIS-compliant cable modem system 100 in which an embodiment of the present invention may operate. In example system 100, a cable network 106, which typically comprises a hybrid fiber-coaxial (HFC) network, provides a point-to-multipoint topology for supporting the communication of data, such as IP packets, between a cable modem termination system (CMTS) 104 at the cable headend and multiple cable modems (CM) 108a-108n at various customer premises. As will be appreciated by persons skilled in the relevant art(s), CMTS 104 operates, in part, as an interface between cable network 106 and a wide area network (WAN) 102, and each of cable modems 108a-108n operates as an interface between cable network 106 and at least one corresponding customer premises equipment (CPE) 110a-110n.

Communication from CMTS 104 to cable modems 108a-108n is customarily referred to as "downstream" communication, and communication from cable modems 108a-108n to CMTS 104 is customarily referred to as "upstream" communication.

An example CMTS and an example cable modem are fully described in U.S. patent application Ser. No. 09/430,821 to Quigley et al., filed Oct. 29, 1999 and entitled "Cable Modem System", the entirety of which is incorporated by reference as if set forth fully herein.

The DOCSIS Radio Frequency Interface (RFI) Specification defines three different radio frequency (RF) interfaces for cable modem systems: (1) the interface between each cable modem 108a-108n and cable network 106, (2) the interface between CMTS 104 and cable network 106 in the downstream direction (toward the customer), and (3) the interface between CMTS 104 and cable network 106 in the upstream direction (traffic from the customer). The most recent version of the DOCSIS RFI Specification is version 2.0, denoted SP-RFIv2.0-I03-021218 (hereinafter, "the DOCSIS RFI Specification"), the entirety of which is incorporated by reference herein.

One difference between DOCSIS 2.0 and earlier versions of the standard is that two different burst type formats are supported for upstream physical (PHY) layer transmissions between cable modems 108a-108n and CMTS 104. In particular, as specified by the DOCSIS RFI Specification, the upstream physical media dependent (PMD) sublayer can use either an FDMA/TDMA burst type format, also referred to as the "TDMA mode," or an FDMA/TDMA/S-CDMA burst type format, also referred to as the "S-CDMA mode." In further accordance with the DOCSIS RFI Specification, two types of TDMA modes are supported: DOCSIS 1.x TDMA and DOCSIS 2.0 TDMA, which is also referred to as "Advanced TDMA" or "A-TDMA." Whether a cable modem transmits data using DOCSIS 1.x TDMA mode, A-TDMA mode, or S-CDMA mode is configured by the CMTS through the transmission of DOCSIS MAC (Media Access Control) Management Messages.

FDMA (frequency division multiple access) indicates that multiple RF channels are assigned in the upstream band. In accordance with FDMA, a cable modem transmits on a single RF channel unless reconfigured to change channels. TDMA (time division multiple access) indicates that upstream transmissions have a burst nature. In accordance with TDMA, a given RF channel is shared by multiple cable modems via the dynamic assignment of time slots. S-CDMA (synchronous code division multiple access) indicates that multiple cable modems can transmit simultaneously on the same RF channel and during the same TDMA time slot, while being separated by different orthogonal codes.

To create a system to allow the above-described TDMA and S-CDMA modes to co-exist, the DOCSIS 2.0 RFI specification has introduced the concept of a logical channel. Prior to DOCSIS 2.0, each upstream channel was allocated its own channel frequency. Thus, all channels could be viewed as physical channels. In DOCSIS 2.0, multiple upstream channels, referred to as logical channels, can share the same RF spectrum. Thus, a physical upstream channel may support multiple logical upstream channels. Each logical channel is identified by a unique channel ID. The CMTS transmits an associated Upstream Channel Descriptor (UCD) and MAP message to completely describe the channel.

DOCSIS 2.0 provides four distinct types of logical upstream channels: (1) DOCSIS 1.x upstream channels that support no A-TDMA features; (2) mixed upstream channels that support DOCSIS 1.x and A-TDMA bursts; (3) A-TDMA only upstream channels that cannot support DOCSIS 1.x cable modems; and (4) S-CDMA upstream channels that support only cable modems operating in S-CDMA mode. All valid logical upstream channels must fall into one of these four categories.

The use of logical channels provides several direct benefits to Multi-System Operators (MSOs) operating DOCSIS 2.0-compliant cable modem systems. For example, by permitting multiple logical channels that support different burst type formats to share a single physical channel, spectrum utilization may be improved and upstream bandwidth may be conserved. Furthermore, the use of logical channels provides better overall system controllability.

Figure 2:
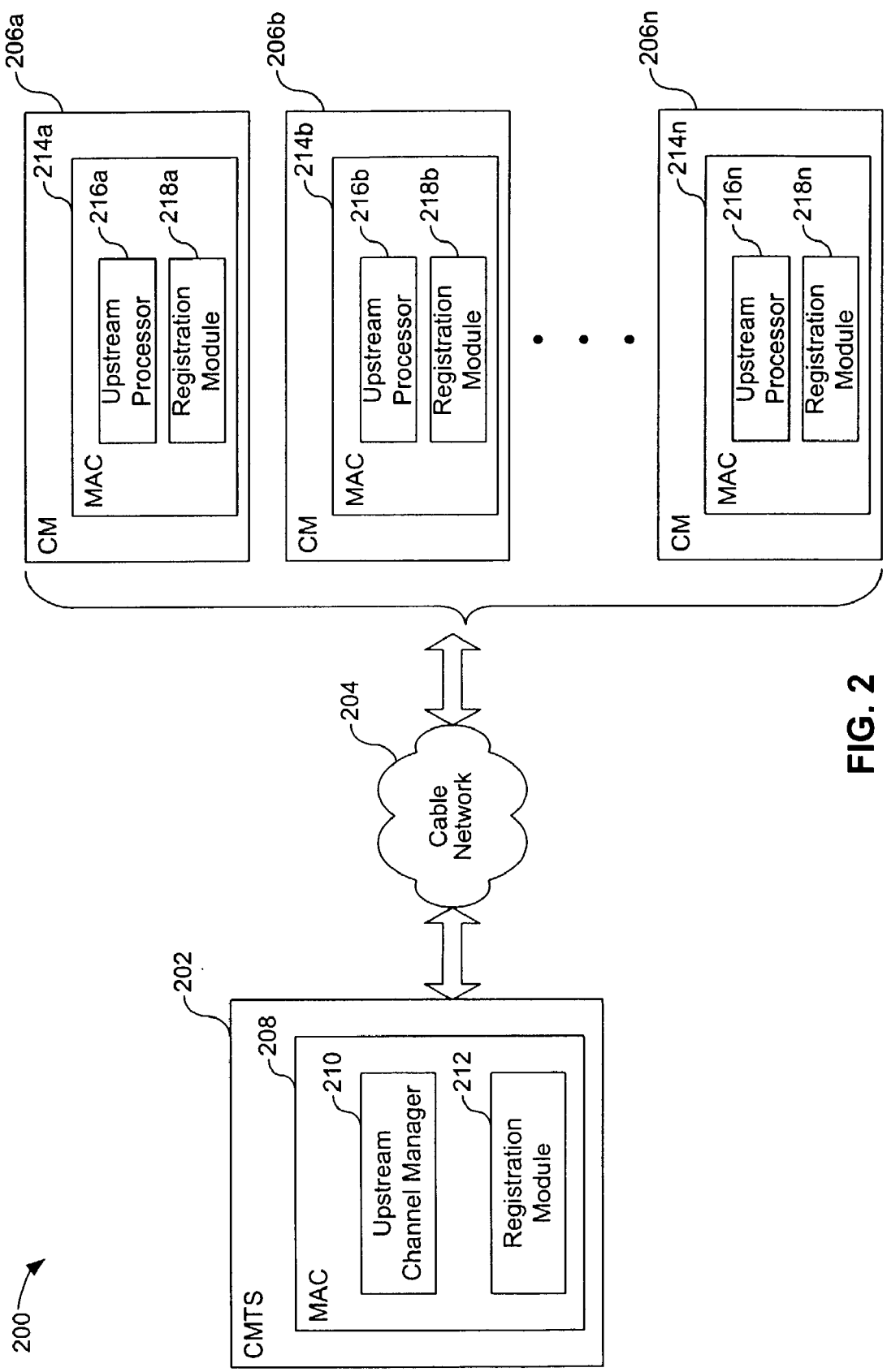
FIG. 2 depicts an example DOCSIS-compliant cable modem system that facilitates communication between devices implementing proprietary features in accordance with an embodiment of the present invention.

B. Facilitating Communication Between Devices Implementing Proprietary Features in Accordance with an Embodiment of the Present Invention FIG. 2 depicts an example cable modem system 200 that implements a method for facilitating communication between devices implementing proprietary features in a DOCSIS-compliant cable modem system in accordance with an embodiment of the present invention. As shown in FIG. 2, cable modem system 200 includes a CMTS 202 that is communicatively coupled via a cable network 204 to a plurality of cable modems 206a-206n. For the purposes of this example, it is assumed that CMTS 202 and cable modems 206a-206n are each configured to support proprietary features that are not provided for, or permitted by, DOCSIS.

As shown in FIG. 2, CMTS 202 comprises a Media Access Control (MAC) sublayer 208, which in turn comprises an upstream channel manager 210 and a registration module 212. Upstream channel manager 210 is configured to perform administrative functions related to the management of upstream communication from cable modems 206a-206n to CMTS 202, including but not limited to establishing logical upstream channels. In the embodiment depicted in FIG. 2, upstream channel manager 210 is implemented as part of CMTS MAC 208; however, the invention is not so limited. For example, upstream channel manager 210 can also be implemented, in whole or in part, as part of an entity external to CMTS 202 and communicatively coupled thereto, such as a network management system external to CMTS 202 and communicatively coupled thereto.

Registration module 212 is configured to perform the CMTS portion of a cable modem initial ranging and registration protocol described in the DOCSIS RFI Specification, as well as the CMTS portion of a proprietary cable modem registration protocol which will be described in more detail herein.

As will be understood by persons skilled in the relevant art(s) from the teachings provided herein, CMTS MAC 208, and each of upstream channel manager 210 and registration module 212 may be readily implemented in hardware, software, or a combination of hardware and software. For example, based on the teachings provided herein, a person skilled in the relevant art could implement the functions of CMTS MAC 208, and the functions of each of upstream channel manager 210 and registration module 212, via a combination of one or more application-specific integrated circuits and a processor core for implementing software commands stored in one or more attached memories. However, this example is not limiting, and other implementations are within the scope and spirit of the present invention.

As also depicted in FIG. 2, each cable modem 206a-206n comprises a respective MAC sublayer 214a-214n, each of which in turn comprises a respective upstream processor 216a-216n and a respective registration module 218a-218na. Each upstream processor 216a-216n is configured to perform functions related to the transmission of data over a logical upstream channel from the cable modem to CMTS 202. Each registration module 216a-216n is configured to perform the cable modem portion of a cable modem initial ranging and registration protocols described in the DOCSIS RFI Specification, as well as the cable modem portion of a proprietary cable modem registration protocol which will be described in more detail herein.

As will be understood by persons skilled in the relevant art(s) from the teachings provided herein, each cable modem MAC 214a-214n, and each respective upstream processor 216a-216n and respective registration module 218a-218n, may be readily implemented in hardware, software, or a combination of hardware and software. For example, based on the teachings provided herein, a person skilled in the relevant art could implement the functions of each cable modem MAC 214a-214n, and each respective upstream processor 216a-216n and respective registration module 218a-218n, via a combination of one or more application-specific integrated circuits and a processor core for implementing software commands stored in one or more attached memories. However, this example is not limiting, and other implementations are within the scope and spirit of the present invention.

Figure 3:
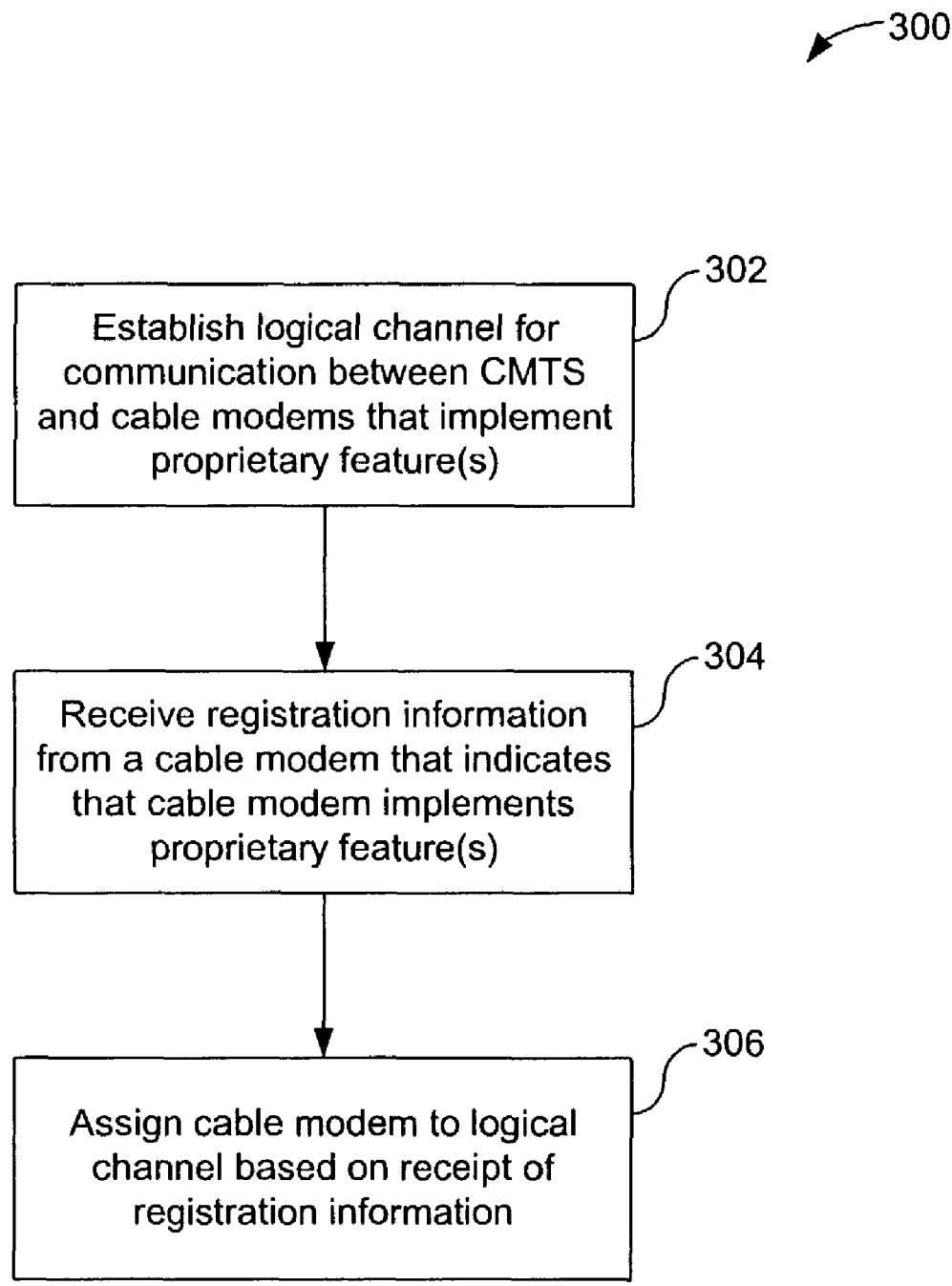
FIG. 3 illustrates a flowchart of a method for facilitating communication between devices implementing proprietary features in a DOCSIS-compliant cable modem system in accordance with an embodiment of the present invention.

FIG. 3 illustrates a flowchart 300 of a method for facilitating communication between devices implementing proprietary features in a DOCSIS-compliant cable modem system in accordance with an embodiment of the present invention.

The invention, however, is not limited to the description provided by the flowchart 300. Rather, it will be apparent to persons skilled in the relevant art(s) from the teachings provided herein that other functional flows are within the scope and spirit of the present invention.

Flowchart 300 will be described with continued reference to example cable modem system 200 described above in reference to FIG. 2. The invention, however, is not limited to that embodiment.

The method of flowchart 300 begins at step 302, in which a logical upstream channel is established to support future communication between CMTS 202 and cable modems that implement one or more proprietary features, such as one or more of cable modems 206a-206n. Various methods for establishing the logical channel will be described in more detail herein. At step 304, CMTS 202 receives registration information from a cable modem, such as one of cable modems 206a-206n, that indicates that the cable modem implements at least one of the one or more proprietary features. The protocol by which this registration is carried out will also be described in more detail herein. Finally, at step 306, CMTS 202 assigns the cable modem to the logical channel based on the receipt of the registration information, at which point the cable modem may transmit data to CMTS 202 over the logical channel.

C. Establishing a Logical Channel in Accordance with an Embodiment of the Present Invention In accordance with an embodiment of the present invention, a CMTS establishes a DOCSIS 2.0 logical upstream channel to facilitate communication between the CMTS and cable modems that support one or more proprietary features. The mechanism provided by the DOCSIS RFI Specification for establishing a logical upstream channel is a MAC Management Message, termed an Upstream Channel Descriptor (UCD), which is broadcast by the CMTS to all cable modems on the network.

However, in accordance with an embodiment of the present invention, the UCD message generated by the CMTS includes parameters not provided for or permitted by DOCSIS that are necessary in order to adequately define the proprietary logical upstream channel. Receipt of such modified UCD messages by cable modems that are not configured to process these parameters may cause these cable modems to malfunction. This interoperability issue is addressed by methods that will now be described.

Figure 4:
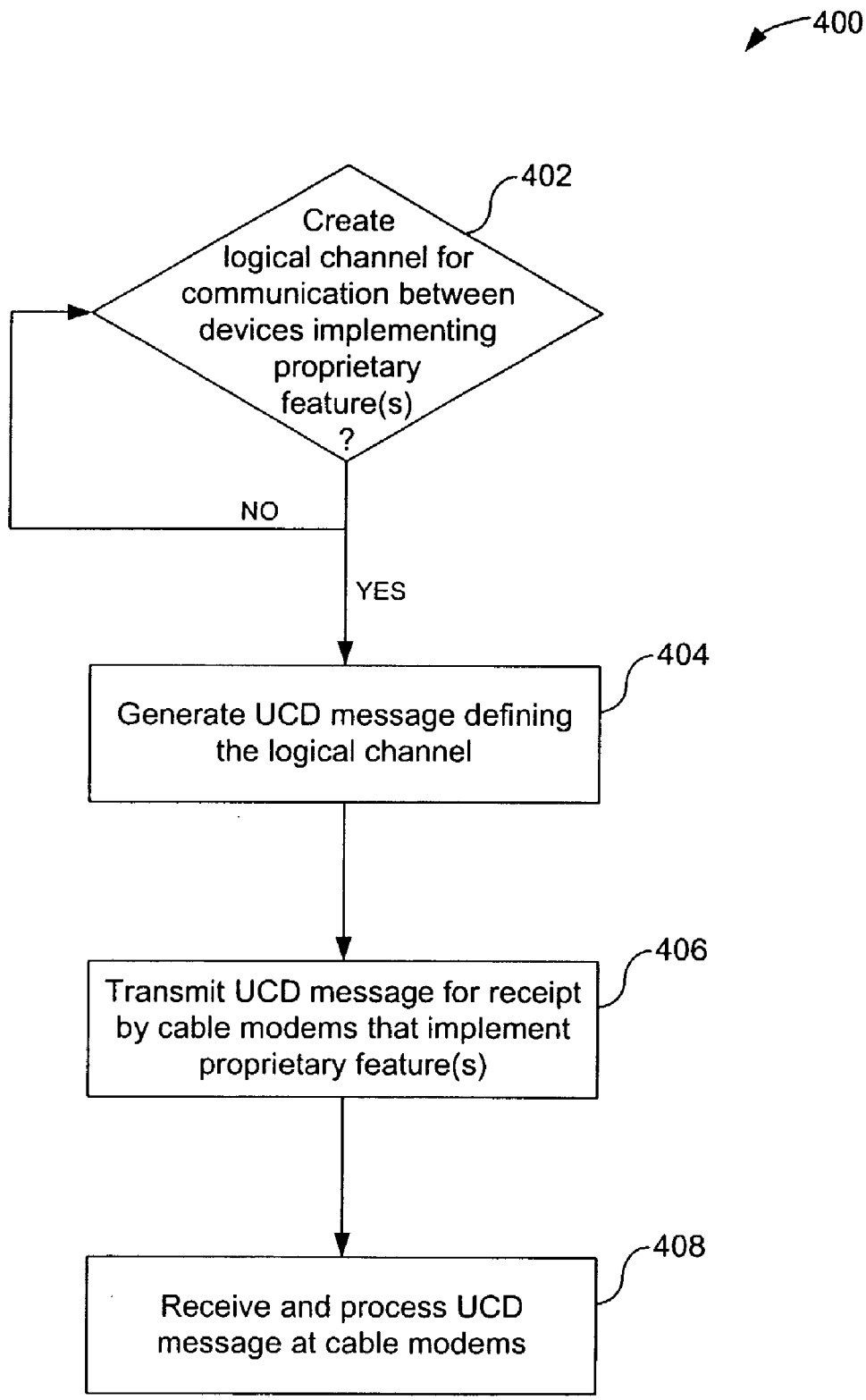
FIG. 4 illustrates a flowchart of a method for establishing a logical channel that facilitates communication between devices implementing proprietary features in a DOCSIS-compliant cable modem system in accordance with an embodiment of the present invention.

FIG. 4 illustrates a flowchart 400 of a method for establishing a logical channel that facilitates communication between devices implementing proprietary features in a DOCSIS-compliant cable modem system in accordance with an embodiment of the present invention. The invention, however, is not limited to the description provided by the flowchart 400. Rather, it will be apparent to persons skilled in the relevant art(s) from the teachings provided herein that other functional flows are within the scope and spirit of the present invention.

The flowchart 400 will be described with continued reference to example cable modem system 200 described above in reference to FIG. 2. The invention, however, is not limited to that embodiment.

The method of flowchart 400 begins at step 402 in which upstream channel manager 210 determines whether or not a logical channel for communication between devices implementing proprietary features should be created. Upstream channel manager 210 may make this determination based on a variety of factors including, but not limited to, a default network configuration, commands from a system administrator, or registration by one or more cable modems that support extended protocols.

If the upstream channel manager 210 determines that a logical channel should be created for communication between devices that implement proprietary features, then upstream channel manager 210 generates a UCD message defining the logical channel as shown at step 404.

Figure 5:
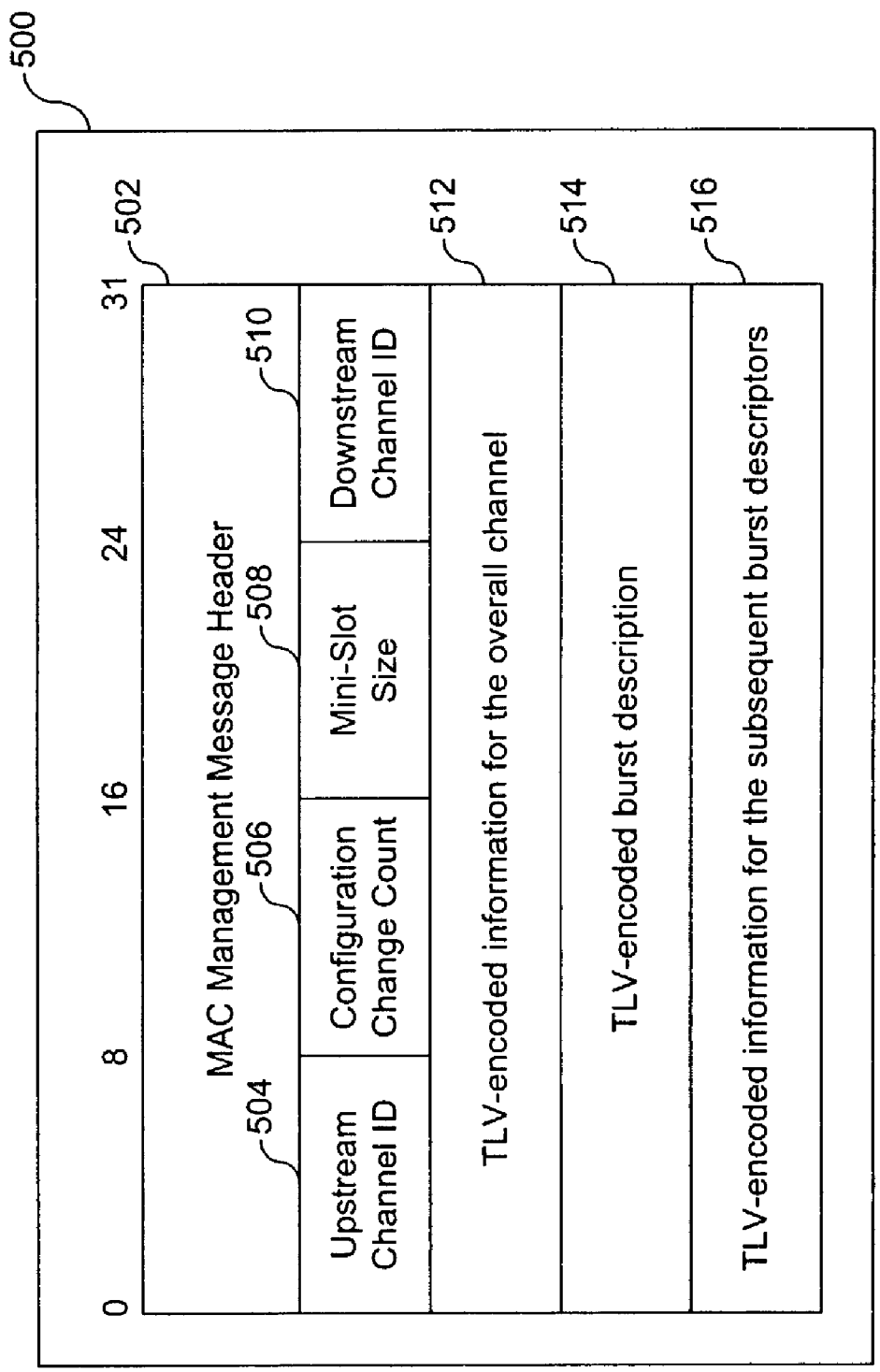
FIG. 5 illustrates a format of a DOCSIS Upstream Channel Descriptor (UCD) message in accordance with the DOCSIS RFI Specification.

FIG. 5 is provided to illustrate a format 500 of a DOCSIS UCD message in accordance with the DOCSIS RFI Specification. As shown in FIG. 5, the DOCSIS UCD message includes a plurality of fields, including a MAC Management Message Header 502, an Upstream Channel Identifier (ID) 504 that uniquely identifies the logical channel, a Configuration Change Count 506, a Minislot Size 508, a Downstream Channel ID 510, TLV-encoded Information for the Overall Channel 512, TLV-encoded Burst Description 514, and TLV-encoded Information for the Subsequent Burst Descriptors 516. A description of each of these fields is provided in the DOCSIS RFI Specification (Ver. SP-RFIv2.0-I03-021218), which is incorporated by reference in its entirety as if set forth fully herein.

In accordance with an embodiment of the present invention, certain fields within the UCD message generated at step 404 are modified to include values that are not provided for or permitted by DOCSIS, but are necessary to define the logical channel used for communication between devices implementing proprietary features. Such modified fields may be included, for example, as part of the TLV-encoded Information for the Overall Channel 512, the TLV-encoded Burst Description 514, and/or the TLV-encoded Information for the Subsequent Burst Descriptors 516.

Figure 6:
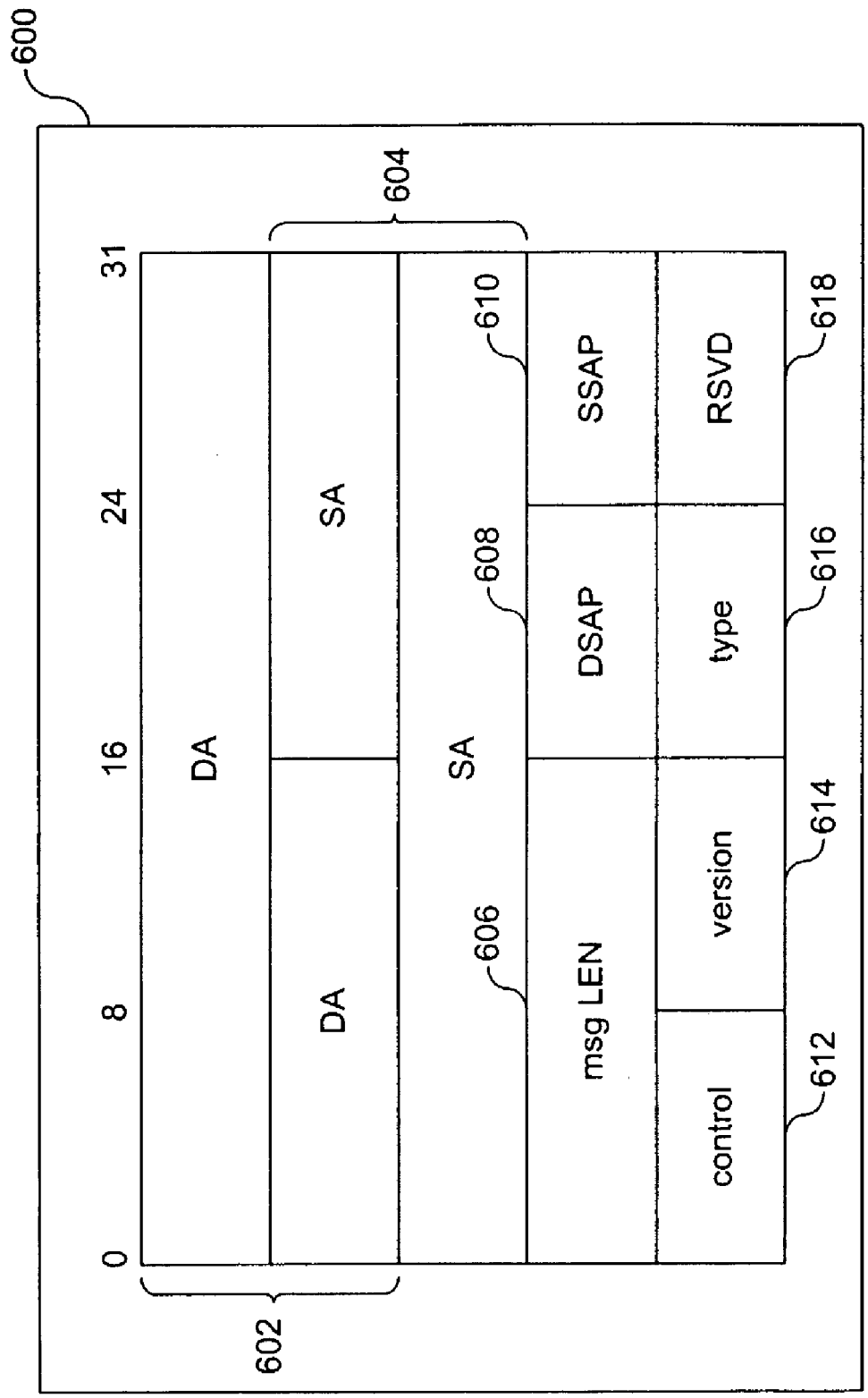
FIG. 6 illustrates a format of a MAC Management Header of a DOCSIS UCD message in accordance with the DOCSIS RFI Specification.

FIG. 6 is provided to illustrate a format 600 of the MAC Management Message Header 502 of UCD message 500 in accordance with the DOCSIS RFI Specification. As shown in FIG. 6, the MAC Management Header 502 includes a plurality of fields, including a Destination Address (DA) 602, a Source Address (SA) 604, a Message Length (msgLEN) 606, a Destination Service Access Port (DSAP) 608, a Source Service Access Port (SSAP) 610, a Control field 612, a Version field 614, a Type field 616, and a Reserved (RSVD) field 618. A description of each of these fields is also provided in the DOCSIS RFI Specification, which is incorporated by reference in its entirety as if set forth fully herein.

In accordance with an embodiment of the present invention, upstream channel manager 210 generates a UCD message at step 404 that has a combination of Version field 614 and Type field 616 that is permitted by the DOCSIS RFI Specification. The DOCSIS RFI Specification provides that for DOCSIS 2.0 only upstream channels, the CMTS must use a value of 3 for Version field 614 and a value of 29 for Type field 616. For all other logical upstream channels, the CMTS must use a value of 1 for Version field 614 and a value of 2 for Type field 616.

At step 406, CMTS 402 transmits the UCD message generated during step 404 downstream for receipt by only those cable modems that implement the proprietary features. This step is necessary because the UCD message may include fields that have been modified to include values that are not provided for, or permitted by, the DOCSIS 2.0 RFI Specification, but are necessary to adequately define the logical channel that supports communication between devices implementing proprietary features as discussed above. Therefore, it is essential to ensure that such modified UCD messages are not processed by cable modems that do not implement the proprietary features, since such processing may cause those cable modems to malfunction.

At step 408, each of the cable modems 406a-406n receives the UCD message. Upstream processors 416a-416n within respective cable modems 406a-406n then process the UCD message to obtain information necessary for transmitting data over the logical upstream channel defined by the UCD message.

Figure 7:
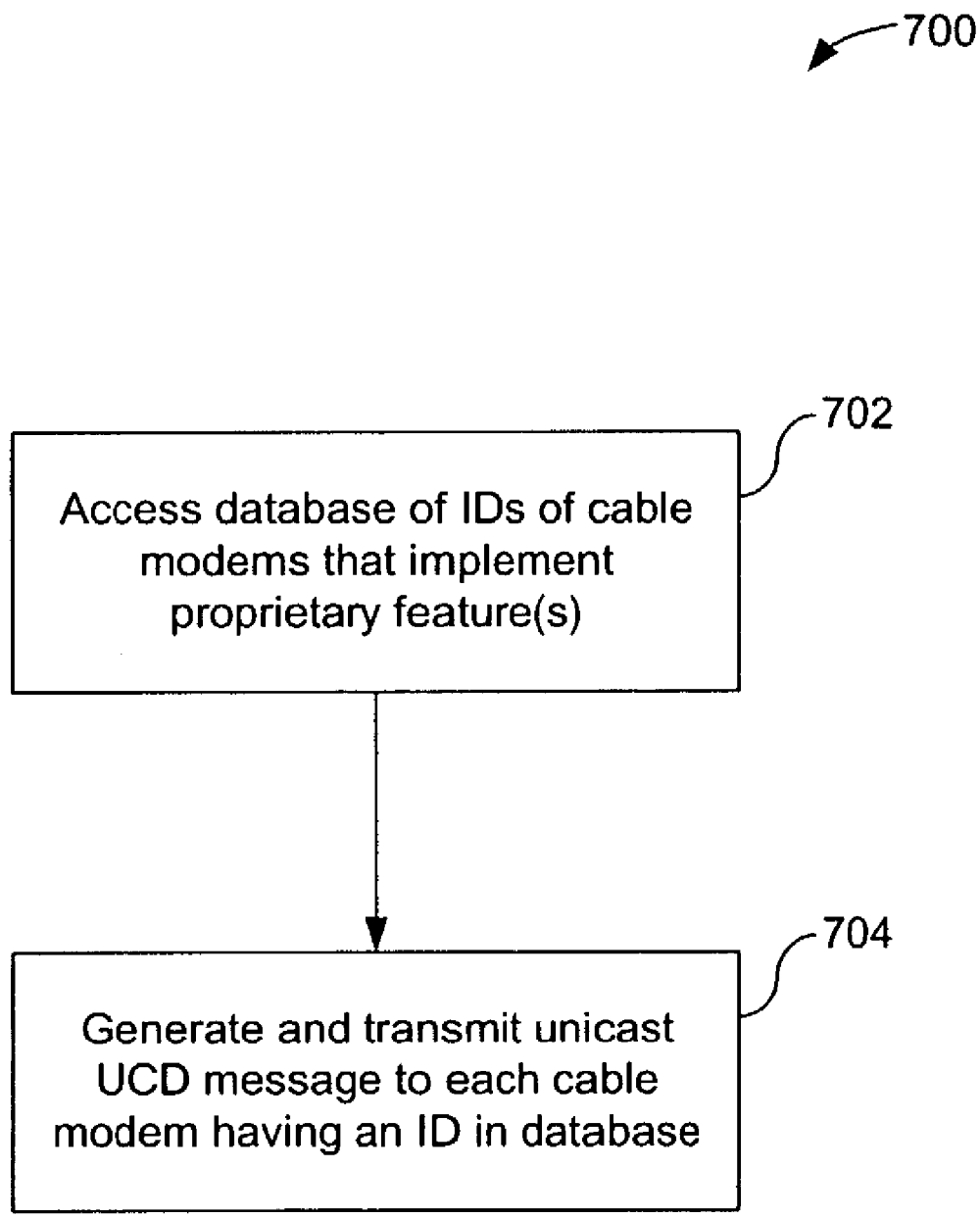
FIG. 7 illustrates a flowchart of a method for selectively sending a UCD message to devices that implement proprietary features in a DOCSIS-compliant cable modem system in accordance with an embodiment of the present invention.

FIG. 7 illustrates a flowchart 700 of one method for implementing step 406 of flowchart 400. As discussed above, step 406 entails transmitting a UCD message downstream for receipt by only those cable modems that implement proprietary features. The invention, however, is not limited to the description provided by the flowchart 700. Rather, it will be apparent to persons skilled in the relevant art(s) from the teachings provided herein that other functional flows are within the scope and spirit of the present invention.

The method of flowchart 700 begins at step 702, in which upstream channel manager 210 accesses a database of unique identifiers (IDs) of cable modems that implement proprietary features. In an embodiment, CMTS 402 determines whether a cable modem implements proprietary features during a cable modem registration protocol, which is described in more detail below. Cable modems so identified during registration are added to the database. In an embodiment, the cable modem ID comprises a MAC address of the cable modem. The database of cable modem IDs is preferably maintained in a memory internal to CMTS MAC 208, although the invention is not so limited.

At step 704, upstream channel manager 210 generates a separate unicast UCD message for each cable modem having an ID in the database. Each unicast UCD message is then transmitted downstream for receipt by a corresponding cable modem. By addressing the UCD message to only those cable modems that implement the proprietary features, this method ensures that cable modems that do not support those features will not process a UCD message that includes parameters not provided for or permitted by DOCSIS.

Figure 8:
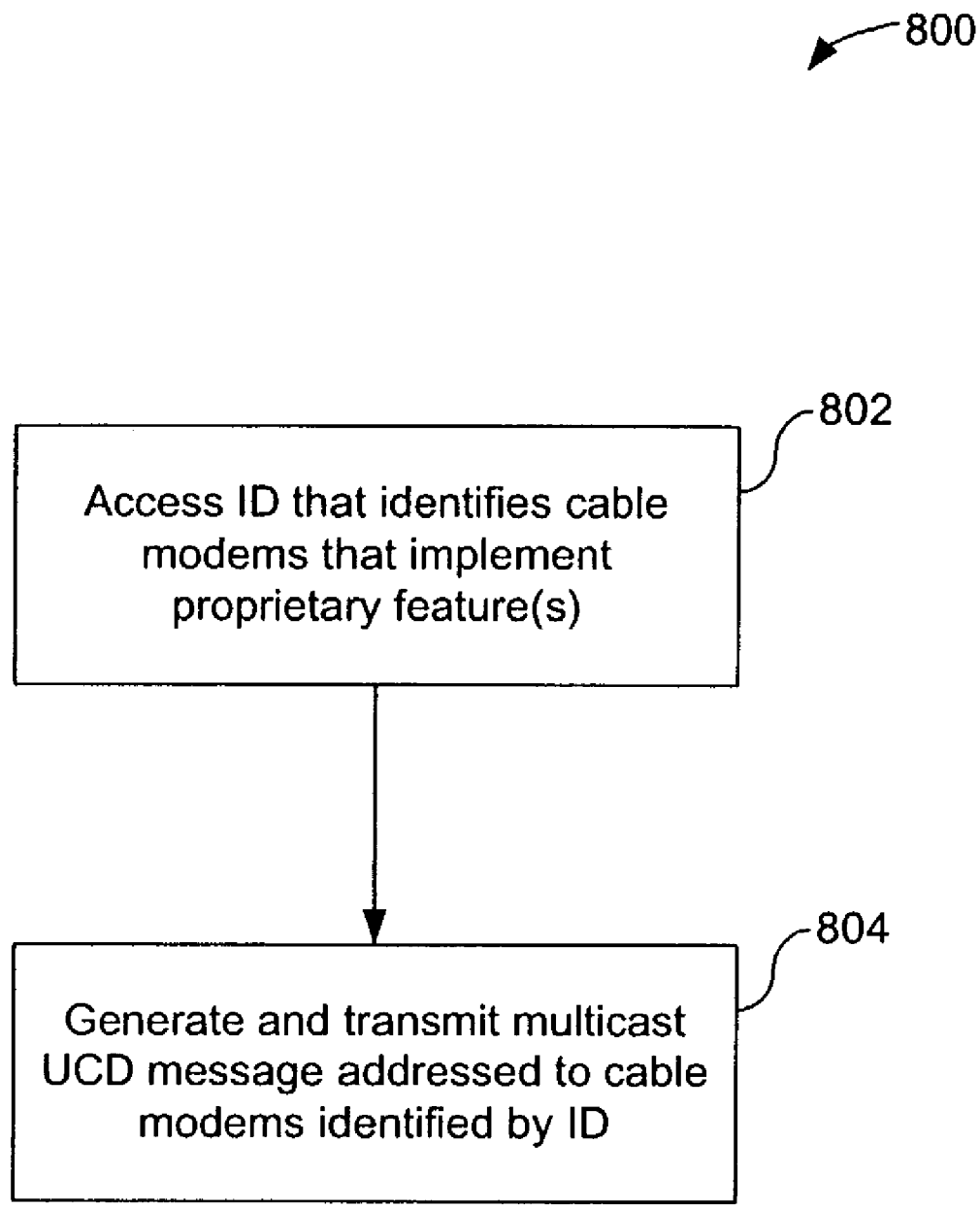
FIG. 8 illustrates a flowchart of a method for selectively sending a UCD message to devices that implement proprietary features in a DOCSIS-compliant cable modem system in accordance with an embodiment of the present invention.

FIG. 8 illustrates a flowchart 800 of an alternate method for implementing step 406 of flowchart 400. As shown in FIG. 8, the method begins at step 802, in which upstream channel manager 210 accesses a unique identifier of cable modems that implement proprietary features. In an embodiment, the unique identifier comprises a multicast address that identifies one or more cable modems that implement proprietary features. In an embodiment, CMTS 402 assigns the multicast address to cable modems that implement proprietary features during a cable modem registration protocol, which will be described in more detail below.

At step 804, upstream channel manager 210 generates a multicast UCD message addressed to each cable modem encompassed by the identifier. The multicast UCD message is then transmitted downstream to be received by only those cable modems. By addressing the UCD message to only those cable modems that implement the proprietary features, this method ensures that cable modems that do not support those features will not process a UCD message that includes parameters not provided for or permitted by DOCSIS.

Figure 9:
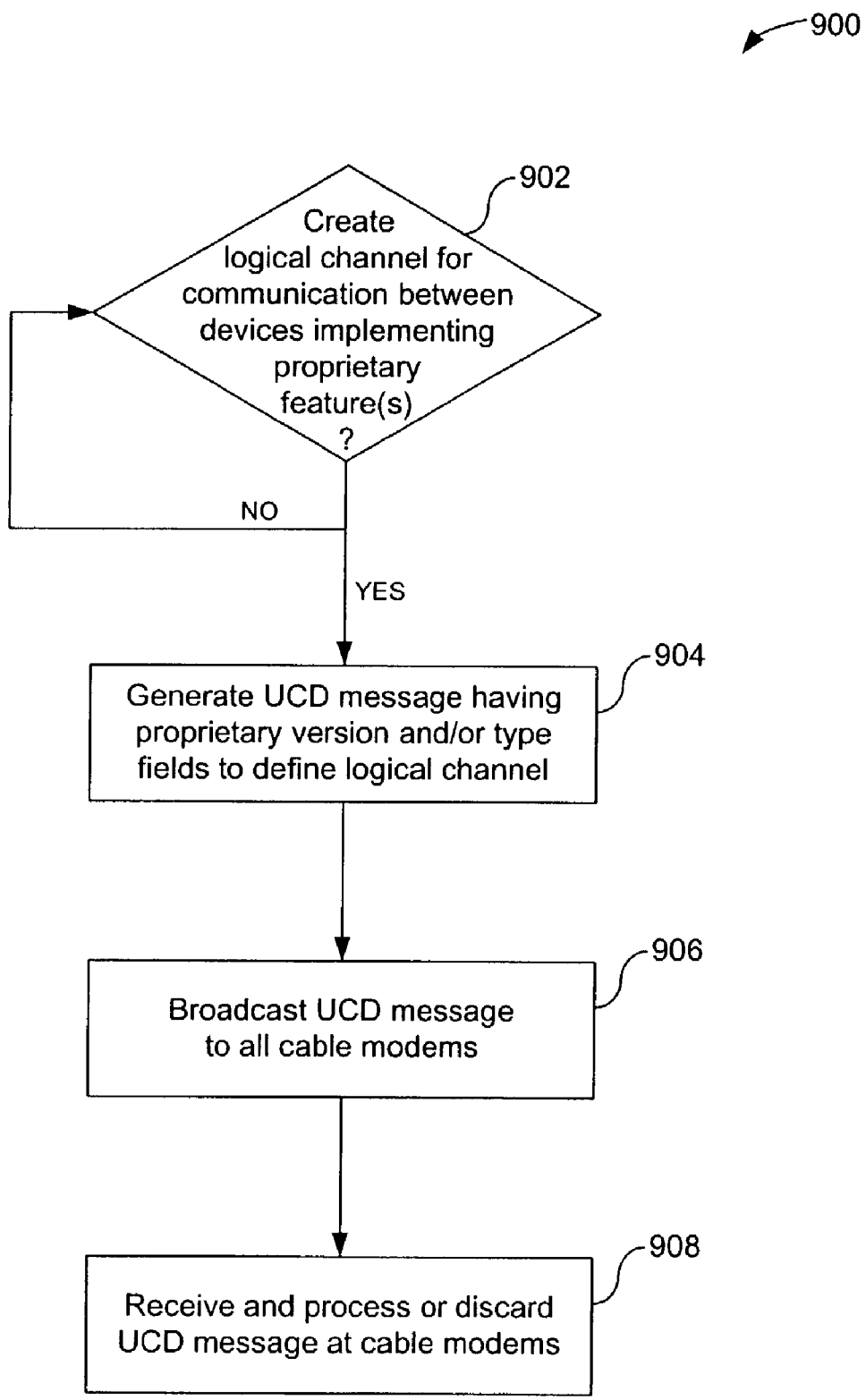
FIG. 9 illustrates a flowchart of an alternate method for establishing a logical channel that facilitates communication between devices implementing proprietary features in a DOCSIS-compliant cable modem system in accordance with an embodiment of the present invention.

FIG. 9 illustrates a flowchart 900 of an alternate method for establishing a logical channel that facilitates communication between devices implementing proprietary features in a DOCSIS-compliant cable modem system in accordance with an embodiment of the present invention. The invention, however, is not limited to the description provided by the flowchart 900. Rather, it will be apparent to persons skilled in the relevant art(s) from the teachings provided herein that other functional flows are within the scope and spirit of the present invention.

The flowchart 900 will also be described with continued reference to example cable modem system 200 described above in reference to FIG. 2. The invention, however, is not limited to that embodiment.

The method of flowchart 900 begins at step 902 in which upstream channel manager 210 determines whether or not a logical channel for communication between devices implementing proprietary features should be created. If the upstream channel manager 210 determines that such a logical channel should be created, then upstream channel manager 210 generates a UCD message defining the logical channel as shown at step 904. As discussed above in reference to step 404 of flowchart 400, certain fields within the UCD message are modified to include values that are not provided for or permitted by DOCSIS, but are necessary to define the logical channel used for communication between devices implementing proprietary features.

Unlike the UCD message generated at step 404 of flowchart 400, however, the UCD message generated at step 904 has a combination of Version field 714 and Type field 716 that is not permitted by the DOCSIS RFI Specification, but will nevertheless be recognized and accepted by cable modems that implement proprietary features. Thus, the method of flowchart 900 assumes that upstream processors 216a-216n within cable modems 206a-206n are configured to accept UCD messages having a Version and Type that are different than those permitted by the DOCSIS RFI Specification.

In particular, the DOCSIS RFI Specification provides that for DOCSIS 2.0 only upstream channels, the CMTS must use a value of 3 for Version field 714 and a value of 29 for Type field 716. For all other logical upstream channels, the CMTS must use a value of 1 for Version field 714 and a value of 2 for Type field 716. Thus, in accordance with the method of flowchart 900, the UCD message has a combination of Version field 714 and Type field 716 that is not [3, 29] or [1, 2], but is some other set of values that will be recognized only by cable modems that implement proprietary features.

At step 906, CMTS 202 broadcasts the UCD message generated during step 904 downstream to all cable modems on the network.

Although all cable modems on the network will receive the UCD message, only those cable modems that implement proprietary features and are configured to recognize and accept UCD messages having the non-conforming Version and Type fields will process the UCD message, as shown at step 908. All other cable modems will discard the UCD messages for having an improper Version and Type field combination, thereby ensuring that cable modems that do not support proprietary features will not process a UCD message that includes parameters not provided for or permitted by DOCSIS.

D. Cable Modem Registration in Accordance with an Embodiment of the Present Invention In accordance with an embodiment of the present invention, it is essential that a CMTS that implements proprietary features be aware of each cable modem on the DOCSIS-compliant network that also implements those features. As will be described in more detail herein, this may be achieved by implementing a proprietary cable modem registration protocol that is an extension of the standard DOCSIS cable modem registration protocol. The protocol enables a CMTS to assign cable modems that implement proprietary features to a logical channel dedicated to communication with devices that implement those features.

Figure 10:
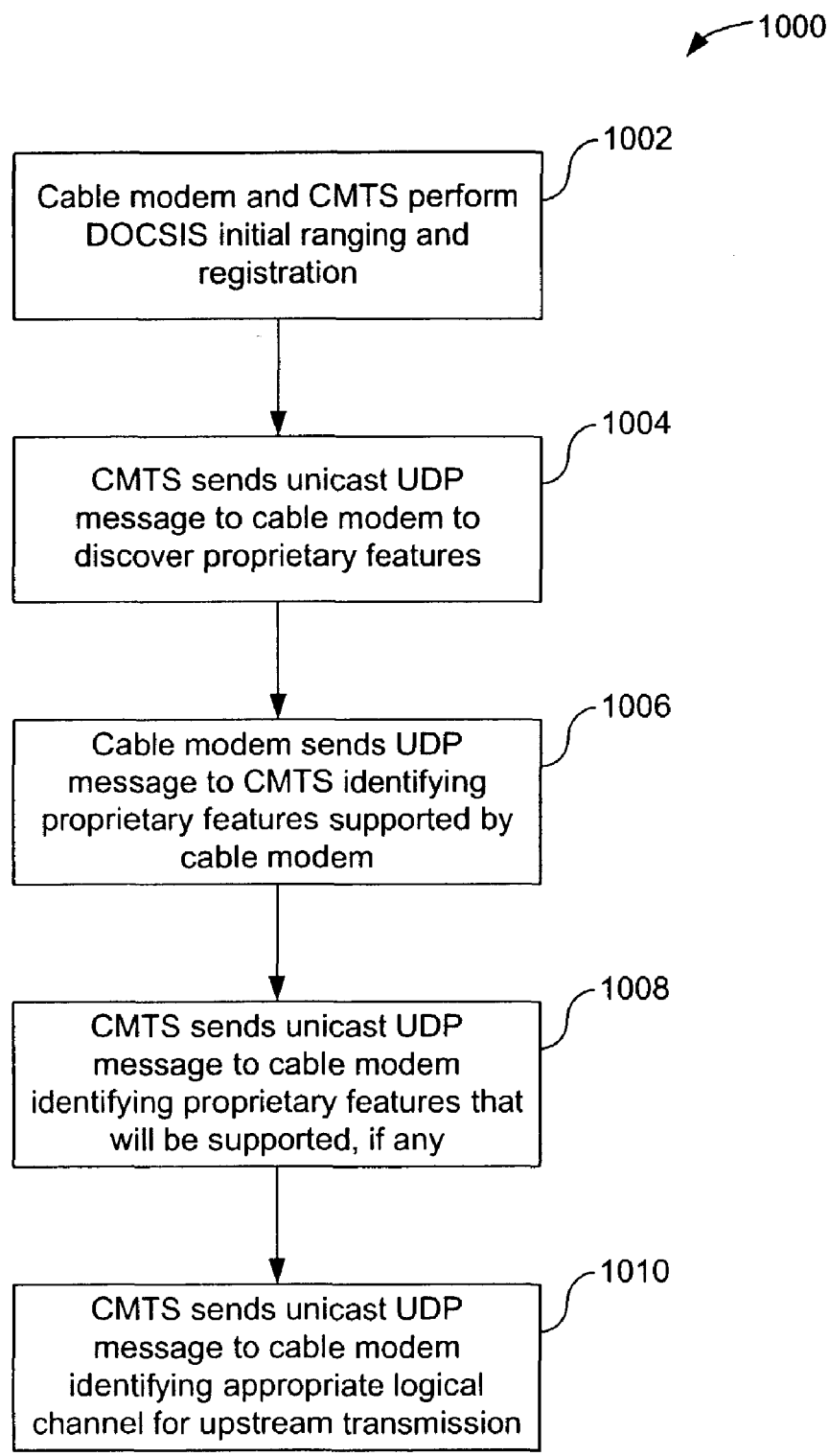
FIG. 10 illustrates a flowchart of a method for registration of a device that implements proprietary features in a DOCSIS-compliant cable modem system in accordance with an embodiment of the present invention.

FIG. 10 illustrates a flowchart 1000 of a method for registration of a device that implements proprietary features in a DOCSIS-compliant cable modem system in accordance with an embodiment of the present invention. The invention, however, is not limited to the description provided by the flowchart 1000. Rather, it will be apparent to persons skilled in the relevant art(s) from the teachings provided herein that other functional flows are within the scope and spirit of the present invention.

The flowchart 1000 will be described with continued reference to example cable modem system 200 described above in reference to FIG. 2. In particular, the flowchart 1000 will be described with reference to an exchange of information between CMTS 202 and cable modem 206a. The invention, however, is not limited to this embodiment.

The method of flowchart 1000 begins at step 1002, in which cable modem 206a and CMTS 202 perform initial ranging and registration in accordance with the standard protocols set forth in the DOCSIS RFI Specification, which are well known in the art. In an embodiment, registration module 212 within CMTS MAC 208 generates messages for the CMTS portion of the protocol, while registration module 218a within cable modem MAC 214a generates messages for the cable modem portion of the protocol.

As shown at step 1004, after standard DOCSIS initial ranging and registration has completed, CMTS 202 generates and transmits at least one unicast UDP message to cable modem 206a to discover if cable modem 206a supports any proprietary features and to indicate its own support of proprietary features. In an embodiment, registration module 212 within CMTS MAC 208 generates the unicast UDP message using the MAC address of cable modem 206a as the destination address.

At step 1006, cable modem 206a receives the unicast UDP message from CMTS 202 and, in response, sends a UDP message to CMTS 202 identifying the proprietary features that are supported by the cable modem 206a. In an embodiment, registration module 218a within cable modem MAC 214a generates this UDP message.

At step 1008, CMTS 202 receives the UDP message transmitted by cable modem 206a in step 1006 and, in response, transmits a second unicast UDP message to cable modem 206a identifying the proprietary features that will be supported during communication with CMTS 202. As will be appreciated by persons skilled in the relevant art(s), the proprietary features that can be implemented for communication between CMTS 202 and cable modem 206a will be one or more of those features that are found in the intersection of the CMTS proprietary feature set and the cable modem proprietary feature set. In an embodiment, registration module 212 within CMTS MAC 208 generates the second unicast UDP message.

At step 1010, CMTS 202 sends a third unicast message to cable modem 206a identifying the appropriate logical channel for upstream transmission, wherein the logical channel supports one or more proprietary features implemented by both CMTS 202 and cable modem 206a. In an alternate embodiment, the unicast UDP messages sent by CMTS 202 in steps 1008 and 1010 are combined into a single unicast UDP message.

The above-described cable modem registration method ensures that cable modems implementing proprietary features will only transmit in logical upstream channels dedicated to devices that implement those features. Moreover, once a cable modem has been assigned to a logical upstream channel, the CMTS will no longer have to determine whether or not the cable modem supports proprietary features or which features are supported, since its feature set can be deduced based on transmission over a particular logical upstream channel.

E. Processor-Based Implementations

Figure 11:
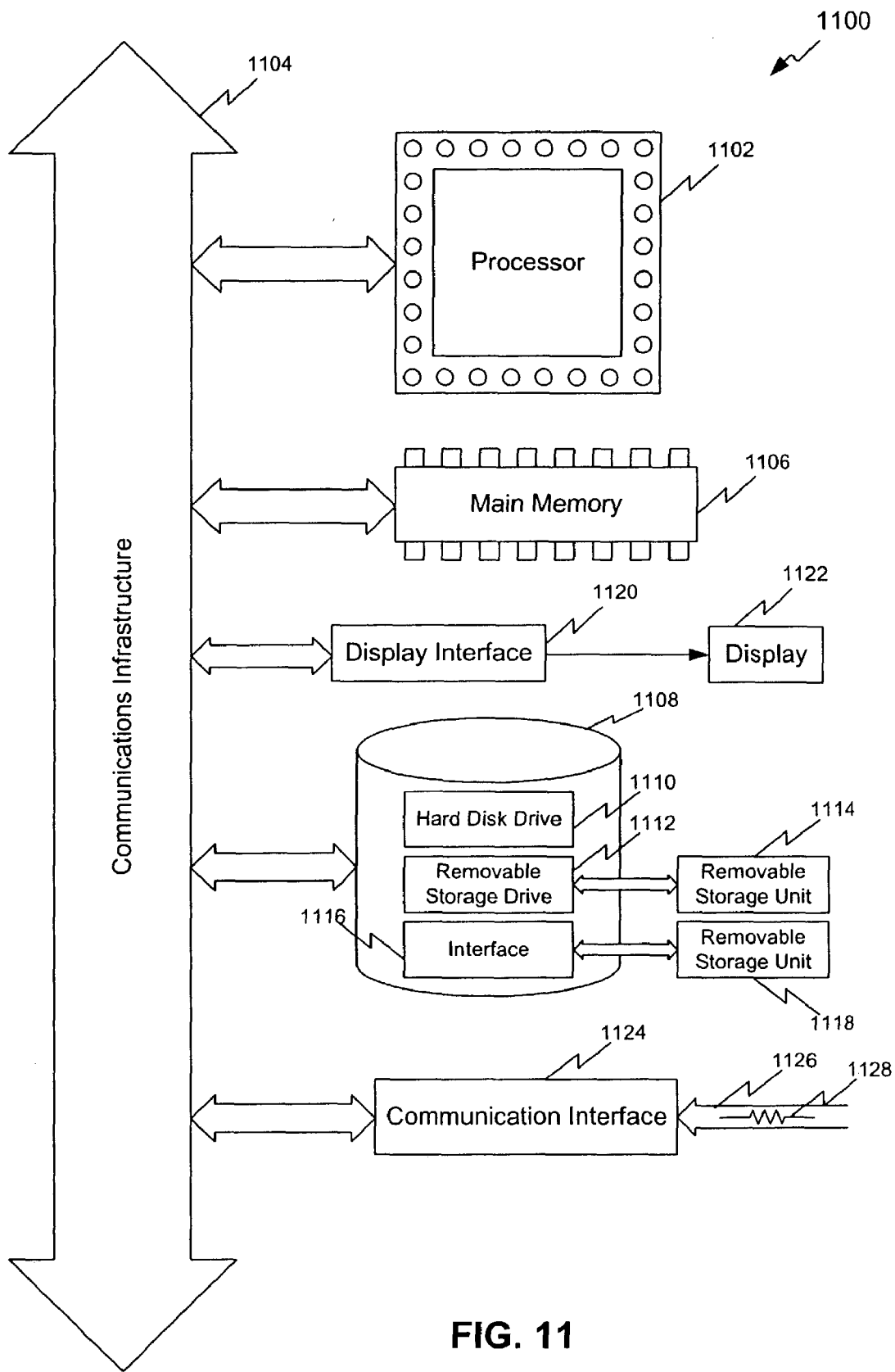
FIG. 11 illustrates an example processor-based system that may implement embodiments of the present invention.

As discussed elsewhere herein, various features of the present invention may be implemented in software and executed by a processor. FIG. 11 depicts an example processor-based system 1100 that may execute software for implementing the features of the present invention, including, but not limited to, any of the features of CMTS 202 or cable modems 206a-206n described above in reference to FIG. 2, and any of the method steps of flowcharts 300, 400, 700, 800, 900, and 1000 described above in reference to FIGS. 3, 4, 7, 8, 9 and 10, respectively.

As shown in FIG. 11, example system 1100 includes a processor 1102 for executing software routines in accordance with embodiments of the present invention. Although a single processor is shown for the sake of clarity, system 1100 may also comprise a multi-processor system. Processor 1102 is connected to a communications infrastructure 1104 for communication with other components of system 1100. Communications infrastructure 1104 may comprise, for example, a communications bus, cross-bar, or network.

System 1100 further includes a main memory 1106, such as a random access memory (RAM), and a secondary memory 1108. Secondary memory 1108 may include, for example, a hard disk drive 1110 and/or a removable storage drive 1112, which may comprise a floppy disk drive, a magnetic tape drive, an optical disk drive, flash memory, or the like. Removable storage drive 1112 reads from and/or writes to a removable storage unit 1114 in a well known manner. Removable storage unit 1114 may comprise a floppy disk, magnetic tape, optical disk, or the like, which is read by and written to by removable storage drive 1112. As will be appreciated by persons skilled in the relevant art(s), removable storage unit 1114 includes a computer usable storage medium having stored therein computer software and/or data.

In alternative embodiments, secondary memory 1108 may include other similar means for allowing computer programs or other instructions to be loaded into system 1100. Such means can include, for example, a removable storage unit 1118 and an interface 1116. Examples of a removable storage unit 1118 and interface 1116 include a program cartridge and cartridge interface (such as that found in video game console devices), a removable memory chip (such as an EPROM, or PROM) and associated socket, and other removable storage units 1118 and interfaces 1116 that allow software and data to be transferred from removable storage unit 1118 to system 1100.

System 1100 further includes a display interface 1120 that forwards graphics, text, and other data from communications infrastructure 1104 or from a frame buffer (not shown) for display to a user on a display unit 1122.

System 1100 also includes a communication interface 1124. Communication interface 1124 allows software and data to be transferred between system 1100 and external devices via a communication path 1126. Examples of communication interface 1124 include a modem, a network interface (such as Ethernet card or 802.11b interface), a communication port, and the like. Software and data transferred via communication interface 1124 are in the form of signals 1128 which can be electronic, electromagnetic, optical or other signals capable of being received by communication interface 1124. These signals 1128 are provided to communication interface 1124 via communication path 1126.

As used herein, the term "computer program product" may refer, in part, to removable storage unit 1114, removable storage unit 1118, a hard disk installed in hard disk drive 1110, or a carrier wave carrying software over communication path 1126 (wireless link or cable) to communication interface 1124. A computer useable medium can include magnetic media, optical media, or other recordable media, or media that transmits a carrier wave or other signal. These computer program products are means for providing software to system 1100.

Computer programs (also called computer control logic) are stored in main memory 1106 and/or secondary memory 1108. Computer programs can also be received via communication interface 1124. Such computer programs, when executed, enable system 1100 to perform the features of the present invention as discussed herein. In particular, the computer programs, when executed, enable processor 1102 to perform the features of the present invention. Accordingly, such computer programs represent controllers of the system 1100.

The features of the present invention can be implemented as control logic in software, firmware, hardware or any combination thereof. In an embodiment where features of the present invention are implemented using software, the software may be stored in a computer program product and loaded into system 1100 using removable storage drive 1112, hard disk drive 1110 or communication interface 1124. Alternatively, the computer program product may be downloaded to system 1100 over communication path 1126. The software, when executed by processor 1102, causes processor 1102 to perform features of the invention as described herein.

In another embodiment, features of the present invention are implemented in firmware and/or hardware using, for example, hardware components such as application specific integrated circuits (ASICs). Implementation of a hardware state machine so as to perform the functions described herein will be apparent to persons skilled in the relevant art(s) from the teachings herein.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, the present invention is not limited to cable modem systems and equipment as described herein, but is equally applicable to any DOCSIS-compliant broadband communications system, including but not limited to broadband terrestrial fixed wireless systems, two-way satellite communication systems, and DSL (Digital Subscriber Line) networks. Accordingly, the breadth and scope of the present invention should not be limited by any of the above-described exemplary embodiments, but should be defined only in accordance with the following claims and their equivalents.

What is claimed is:

1. A method for facilitating communication between devices implementing proprietary features in a broadband communication system, wherein the broadband communication system complies with a Data Over Cable Service Interface Specification (DOCSIS) standard, comprising:

determining whether a first device implements at least one proprietary feature that is not provided for, or permitted by, the DOCSIS standard;

establishing a logical channel, in response to determining that said first device implements said at least one proprietary feature that is not provided for, or permitted by, the DOCSIS standard, for communication between said first device and other devices that implement said at least one proprietary feature, wherein said logical channel is derived from a single physical channel and shares an RF spectrum of the single physical channel with at least one other logical channel;

receiving registration information from a second device, wherein said registration information indicates that said second device implements said at least one proprietary feature; and assigning said second device to said logical channel in response to receiving said registration information.

2. The method of claim 1, wherein said first device comprises a cable modem termination system (CMTS) and said second device comprises a cable modem.

3. The method of claim 1, wherein said establishing a logical channel comprises generating an Upstream Channel Descriptor (UCD) message, wherein said UCD message includes at least one proprietary parameter.

4. The method of claim 3, wherein said generating a UCD message comprises generating said UCD message-having a version field or a type field that comprises a value not provided for by the DOCSIS standard.

5. The method of claim 3, wherein said establishing a logical channel further comprises sending said UCD message only to devices that implement said at least one proprietary feature.

6. The method of claim 5, wherein said sending said UCD message only to said devices that implement said at least one proprietary feature comprises:

accessing a database of identifiers of said devices that implement said at least one proprietary feature; and generating a unicast UCD message addressed to each of said devices having an identifier in said database.

7. The method of claim 5, wherein said sending said UCD message only to said devices that implement said at least one proprietary feature comprises:

accessing an identifier that identifies a plurality of said devices that implement said at least one proprietary feature; and generating a multicast UCD message addressed to said plurality devices identified by said identifier.

8. The method of claim 1, wherein said receiving said registration information from said second device comprises:

sending a first unicast message to said second device to determine if said second device implements any proprietary features;

receiving a message from said second device, wherein said message identifies said any proprietary features implemented by said second device; and sending a second unicast message to said second device identifying support for said at least one proprietary feature.

9. The method of claim 1, wherein said assigning said second device to said logical channel comprises generating a unicast message to said second device identifying said logical channel.

10. A cable modem termination system (CMTS) that implements at least one proprietary feature in a cable modem system, wherein the cable modem system complies with a Data Over Cable Service Interface Specification (DOCSIS) standard, the at least one proprietary feature not being provided for, or permitted by, the DOCSIS standard, the CMTS comprising:

an upstream channel manager configured to establish a logical channel, in response to determining that a first cable modem implements the at least one proprietary feature the at least one proprietary feature not being provided for, or permitted by, the DOCSIS standard, for communication between the first cable modem and other cable modems that implement the at least one proprietary feature, wherein said logical channel is derived from a single physical channel and shares an RF spectrum of the single physical channel with at least one other logical channel; and a registration module configured to receive registration information from a second cable modem, wherein said registration information indicates that said cable modem implements the at least one proprietary feature, and to assign said cable modem to said logical channel in response to receiving said registration information.

11. The CMTS of claim 10, wherein said upstream channel manager is configured to determine whether or not to establish said logical channel.

12. The CMTS of claim 10, wherein said upstream channel manager is configured to generate a Upstream Channel Descriptor (UCD) message that includes at least one proprietary parameter.

13. The CMTS of claim 12, wherein said upstream channel manager is configured to generate a UCD message having a version field or a type field that comprises a value not provided for by the DOCSIS standard.

14. The CMTS of claim 12, wherein said upstream channel manager is further configured to send said UCD message only to cable modems that implement said at least one proprietary feature.

15. The CMTS of claim 14, wherein said upstream channel manager is configured to access a database of identifiers of cable modems that implement the at least one proprietary feature, and to generate a unicast UCD message addressed to each of said cable modems having an identifier in said database.

16. The CMTS of claim 14, wherein said UCD upstream channel manager is configured to access an identifier that identifies a plurality of cable modems that implement said at least one proprietary feature, and to generate a multicast UCD message addressed to said plurality of cable modems identified by said identifier.

17. The CMTS of claim 10, wherein said registration module is configured to send a first unicast message to said second cable modem to determine if said second cable modem implements any proprietary features, to receive a message from said second cable modem, wherein said message identifies any proprietary features implemented by said second cable modem, and to send a second unicast message to said second cable modem identifying support for the at least one proprietary feature.

18. The CMTS of claim 10, wherein said registration module is configured to generate a unicast message to said second cable modem identifying said logical channel.

19. A computer program product comprising a non-transitory computer readable storage medium having computer program logic recorded thereon for enabling a processor to facilitate communication between devices implementing proprietary features in a broadband communication system, wherein the broadband communication system complies with a Data Over Cable Service Interface Specification (DOCSIS) standard, said computer program logic comprising:

instructions for enabling the processor to determine whether a first device implements at least one proprietary feature that is not provided for, or permitted by, the DOCSIS standard;

instructions for enabling the processor to establish a logical channel, in response to determining that said first device implements said at least one proprietary feature that is not provided for, or permitted by, the DOCSIS standard, for communication between said first device and other devices that implement said at least one proprietary feature, wherein said logical channel is derived from a single physical channel and shares an RF spectrum of the single physical channel with at least one other logical channel;

instructions for enabling the processor instructions to receive registration information from a second device, wherein said registration information indicates that said second device implements said at least one proprietary feature; and instructions for enabling the processor to assign said second device to said logical channel in response to receiving said registration.

20. The computer program product of claim 19, wherein said first device comprises a cable modem termination system (CMTS) and said second device comprises a cable modem.

21. The computer program product of claim 19, wherein said instructions for enabling the processor to establish a logical channel comprises instructions for enabling the processor to generate an Upstream Channel Descriptor (UCD) message, wherein said UCD message includes at least one proprietary parameter.

22. The computer program product of claim 21, wherein said instructions for enabling the processor to generate a UCD message comprises instructions for enabling the processor to generate a UCD message having a version field or a type field that comprises a value not provided for by the DOCSIS standard.

23. The computer program product of claim 21, wherein said instructions for enabling the processor to establish a logical channel further comprises instructions for enabling the processor to send said UCD message only to devices that implement said at least one proprietary feature.

24. The computer program product of claim 23, wherein said instructions for enabling the processor to send said UCD message only to said devices that implement said at least one proprietary feature comprises:

instructions for enabling the processor to access a database of identifiers of devices that implement said at least one proprietary feature; and instructions for enabling the processor to generate a unicast UCD message addressed to each of said devices having an identifier in said database.

25. The computer program product of claim 23, wherein said instructions for enabling the processor to send said UCD message only to devices that implement said at least one proprietary feature comprises:

instructions for enabling the processor to access an identifier that identifies a plurality of devices that implement said at least one proprietary feature;

instructions for enabling the processor to generate a multicast UCD message addressed to said plurality devices identified by said identifier.

26. The computer program product of claim 19, wherein said instructions for enabling the processor to receive said registration information from said second device comprises:
- instructions for enabling the processor to send a first unicast message to said second device to determine if said second device implements any proprietary features;
- instructions for enabling the processor to receive a message from said second device, wherein said message identifies any proprietary features implemented by said second device; and
- instructions for enabling the processor to send a second unicast message to said second device identifying support for said at least one proprietary feature.

27. The computer program product of claim 19, wherein said instructions for enabling the processor to assign said second device to said logical channel comprises instructions for enabling the processor to generate a unicast message to said second device identifying said logical channel.

* * * * *

UNITED STATES PATENT AND TRADEMARK OFFICE
CERTIFICATE OF CORRECTION

| | | |
|---|---|---|
| PATENT NO. | : 8,040,915 B2 | Page 1 of 1 |
| APPLICATION NO. | : 10/440325 | |
| DATED | : October 18, 2011 | |
| INVENTOR(S) | : Scott A. Cummings | |

It is certified that error appears in the above-identified patent and that said Letters Patent is hereby corrected as shown below:

Column 14, line 24, claim 4 please replace "message-having" with --message having--;

Column 15, line 4, claim 10 please replace "feature the at least one propriety feature not being" with --feature, the at least one propriety feature not being--;

Column 16, line 31, claim 21 please replace "comprises" with --comprise--;

Column 16, line 37, claim 22 please replace "comprises" with --comprise--;

Column 16, line 43, claim 23 please replace "comprises" with --comprise--;

Column 16, line 50, claim 24 please replace "comprises:" with --comprise:--;

Column 16, line 60, claim 25 please replace "comprises" with --comprise--;

Column 17, line 3, claim 26 please replace "comprises:" with --comprise:--; and

Column 18, line 6, claim 27 please replace "comprises" with --comprise--.

Signed and Sealed this
Twenty-sixth Day of June, 2012

David J. Kappos
*Director of the United States Patent and Trademark Office*